US007150852B1

United States Patent
Beierle, legal—incapacitated et al.

(10) Patent No.: US 7,150,852 B1
(45) Date of Patent: Dec. 19, 2006

(54) SYSTEM AND METHOD FOR REDUCING GALVANIC CORROSION ASSOCIATED WITH A MECHANICAL LOCKING DEVICE

(75) Inventors: Carl J. Beierle, legal—incapacitated, Toms River, NJ (US); by Barbara Beierle, legal representative, Toms River, NJ (US); Jules F. Senske, Lake Hopatcong, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 526 days.

(21) Appl. No.: 10/605,090

(22) Filed: Sep. 8, 2003

Related U.S. Application Data

(60) Provisional application No. 60/320,168, filed on May 6, 2003.

(51) Int. Cl.
*C23F 11/00* (2006.01)

(52) U.S. Cl. .......................... 422/7; 422/6; 252/400.54; 106/14.05; 106/14.21

(58) Field of Classification Search .................... 422/7, 422/6; 252/400.54; 106/14.05, 14.21
See application file for complete search history.

(56) References Cited

U.S. PATENT DOCUMENTS

| 4,692,988 A | * | 9/1987 | Shulver et al. ............... 29/458 |
| 5,302,679 A | * | 4/1994 | Maandi et al. ............. 526/262 |
| 5,373,075 A | | 12/1994 | Maandi |
| 2002/0195592 A1 | * | 12/2002 | Geer et al. .................. 252/500 |

\* cited by examiner

*Primary Examiner*—Bruce F. Bell
(74) *Attorney, Agent, or Firm*—Robert Charles Beam; John F. Moran

(57) ABSTRACT

A method and system for preventing galvanic corrosion associated with a fastener of a first metal type and within an orifice of a second metal type for receiving said fastener. The method includes coating the fastener with a corrosive inhibitor and by further coating at least one of the fastener and orifice with an anaerobic composition that expands after the fastener is inserted into the orifice. The system includes a corrosive inhibitor coating at least a portion of the fastener adapted to contact the second metal type; and an anaerobic composition interposed between the corrosive inhibited portion of the fastener and orifice, and adapted to expand after the corrosive inhibitor portion of the fastener is inserted into the orifice.

22 Claims, 3 Drawing Sheets

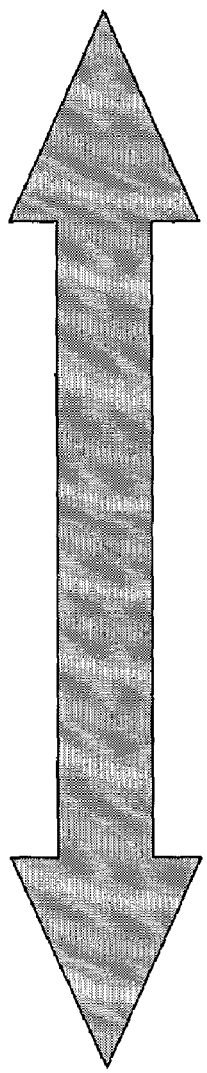

Anodic

Cathodic

Magnesium
Zinc
Beryllium
Aluminum Alloys
Cadmium
Mild Steel, Cast Iron
Low Alloy Steel
Austenitic Nickel Cast Iron
Aluminum Bonze
Naval Brass, Yellow Brass, Red Brass
Tin
Copper
Pb-Sn Solder (50/50)
Admiralty, Aluminum Brass
Manganese Bronze
Silicon Bronze
Tin Bronzes (G & M)
Stainless Steel - Type 410, 416
Nickel Silver
90-10 Copper Nickel
80-20 Copper Nickel
Stainless Steel - Type 430
Lead
70-30 Copper Nickel
Nickel-Aluminum Bronze
Nickel Chromium Alloy 600
Silver Braze Alloys
Nickel 200
Silver
Stainless Steel - Types 302, 304, 321, 347
Nickel-Copper Alloys 400, K-500
Stainless Steel - Types 316, 317
Alloy "20" Stainless Steels, Cast and Wrought
Nickel-Iron-Chromium Alloy 825
Ni-Cr-Mo-Cu-Si Alloy B
Titanium
Ni-Mo-Cr Alloy C
Platinum
Graphite

FIGURE 3

SYSTEM AND METHOD FOR REDUCING GALVANIC CORROSION ASSOCIATED WITH A MECHANICAL LOCKING DEVICE

CROSS REFERENCE TO RELATED APPLICATIONS

This application claims benefit under 35 USC 119(e) of provisional application 60/320,168 filed May 6, 2003, the entire wrapper contents of which provisional application are herein incorporated by reference as though fully set forth at length.

FEDERAL RESEARCH STATEMENT

[The invention described herein may be made, used or licensed for or by the U.S. Government for government purposes.]

BACKGROUND OF INVENTION

1. Field of the Invention

The present invention is directed generally to a system and method for providing corrosion protection for mechanical locking devices and, more particularly, to a system and method for providing improved resistance to galvanic corrosion associated with a locking device.

2. Background of the Invention

Galvanic corrosion, also called "dissimilar metal corrosion" and sometimes "electrolysis", refers to corrosive damage induced when two dissimilar materials are coupled together in the presence of a corrosive electrolyte. The more nobel a metal, the more cathodic it is on the galvanic series, while less nobel metals are more anodic on the galvanic series. A galvanic couple forms when one of the metals in the couple becomes an anode, causing it to corrode faster than it otherwise would, while the other metal in the couple becomes a cathode, and thus corrodes slower than it otherwise would. Additionally, it is not uncommon in practice for a cathodic metal to provide greater surface area than the anodic metal, thereby further exacerbating the reduction reaction, and increasing the corrosion of the anodic metal. It may also be noted that although the extent of corrosion may be greatest at the interface of the two dissimilar metals, corrosion may also occur at some distance away from the actual interface.

Historically, mechanical locking devices often fail, or need to be serviced, due to galvanic corrosion. Locking devices are often made of steel, and are often used with dissimilar metals, such as aluminum. For example, a tang, or locking ring, may be used. Steel is relatively nobel, or cathodic, while aluminum is a relatively active, or anodic. The interface of these two dissimilar metals may tend to create galvanic corrosion, causing in this example the aluminum to erode away. This may undesirably lead to an otherwise premature failure of the mechanical locking device, or steel tong.

Of course, the present invention is suitable for use with a wide variety of locking devices that secure something together, including by way of non-limiting example only, tongs, screws, bolts, nails and rivets, to name just a few.

Common methods of preventing galvanic corrosion have included covering the surfaces of the corroding metal with various types of paint; selecting combinations of metals that are from groups that are close together in the galvanic series; or plating with compounds such as cadmium and zinc. However, protective coatings such as paint historically fail to provide adequate protection against galvanic corrosion. Common limitations with these protective coatings include: degradation by exposure to the environment, and specifically to environmental elements such as ultra-violet light, acid rain, and saline environments; incomplete coverage of the metal surface by the protective coating; or the development of breaks in the protective coating through mechanical abrasion. More specifically, such protective coatings often do not adhere well to the metal substrate, allowing the coating to flake off or erode away. Additionally, some mechanical locking mechanisms, such as staking, defeat certain corrosion protection coatings by stripping away the protective layer upon installation allowing the two dissimilar base metals to come in contact with one another. Other conventional methods may suffer drawbacks as well.

SUMMARY OF INVENTION

A method for preventing galvanic corrosion associated with a metal fastener and orifice with dissimilar compositions by coating the fastener with a corrosive inhibitor and by further coating at least one of the fastener and orifice with an anaerobic composition that expands after the fastener is inserted into the orifice.

A system for reducing galvanic corrosion associated with fastener of a first metal type and an orifice in a second metal type and for receiving the fastener, the system including: a corrosive inhibitor coating at least a portion of the fastener adapted to contact the second metal type; and an anaerobic composition interposed between the corrosive inhibited portion of the fastener and orifice, and adapted to expand after the corrosive inhibitor portion of the fastener is inserted into the orifice.

BRIEF DESCRIPTION OF DRAWINGS

Understanding of the present invention will be facilitated by consideration of the following detailed description of the preferred embodiments of the present invention taken in conjunction with the accompanying drawings, in which like numerals refer to like parts, and wherein:

FIG. 3 illustrates a table indicative of the Galvanic Series.

DETAILED DESCRIPTION

It is to be understood that the figures and descriptions of the present invention have been simplified to illustrate elements that are relevant for a clear understanding of the present invention, while eliminating, for purposes of clarity, many other elements found in typical mechanical locking devices. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
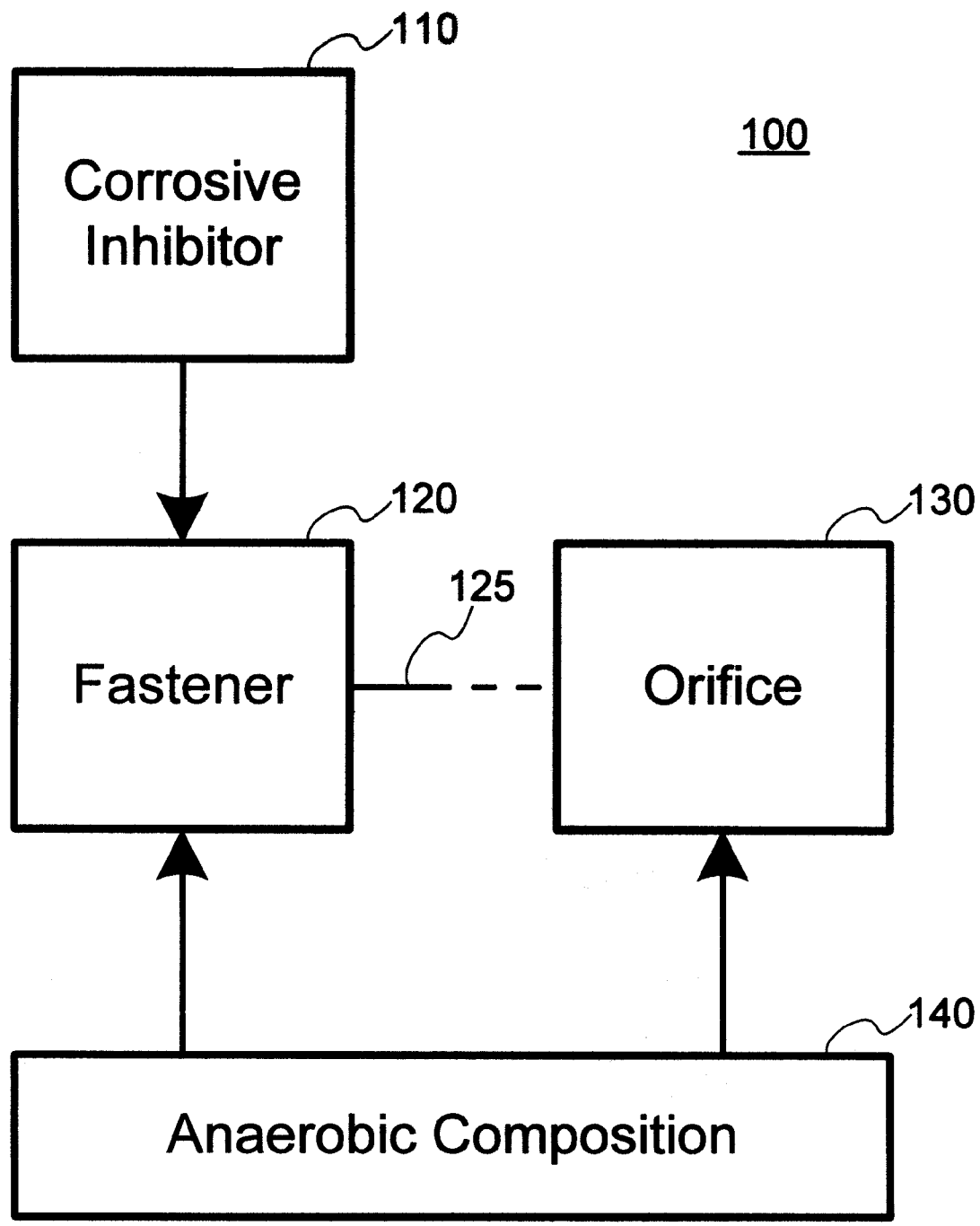
FIG. 1 illustrates a schematic diagram a method for preventing galvanic corrosion associated with a metal fastener and orifice.

FIG. 1 shows a schematic diagram of a system 100 for preventing galvanic corrosion 125, associated with a fastener 120 at least partially residing within an orifice 130, wherein fastener 120 and orifice 130 are composed of and formed in dissimilar metal compositions that would otherwise be subject to galvanic corrosion. According to an aspect of the present invention, galvanic corrosion associated with fastener 120 residing within orifice 130 may be at least partially mitigated by coating at least a portion of the fastener 120 adapted to contact on interior wall of orifice 130 with a corrosive inhibitor 110, and coating the already coated portion of the fastener 120 and/or the orifice 130 with an anaerobic composition 140 that expands after the fastener 120 is inserted into the orifice.

The step of coating a portion of the fastener 120 adapted to contact an interior wall of the orifice with a corrosive inhibitor may include spraying, dipping, painting and plating, for example, as is known in the art. Of course, any suitable method may be used for coating. The corrosive inhibitor coating may be, but is not limited to, molybdenum disulfide.

An anaerobic composition 140 that expands after the corrosive inhibited portion of the fastener 120 is inserted into the orifice 130 may be used. Composition 140 may take the form of, but is not limited to, a composition of aromatic dimethacrylate ester, hydroalkyl methacrylate, and bisphenol A fumarate resin, for example. A method of making a suitable compound is disclosed in U.S. Pat. No. 5,373,075, entitled "Anaerobic Compositions Which Expand When Post-Cured", the entire disclosure of which is hereby incorporated by reference as if being set forth in its entirety herein. The step of coating the corrosive inhibited portion of the fastener 120 and/or the orifice 130 with anaerobic composition 140 may include, for example, spraying, dipping, painting or plating techniques. Again, any suitable coating technique may be used.

Figure 2:
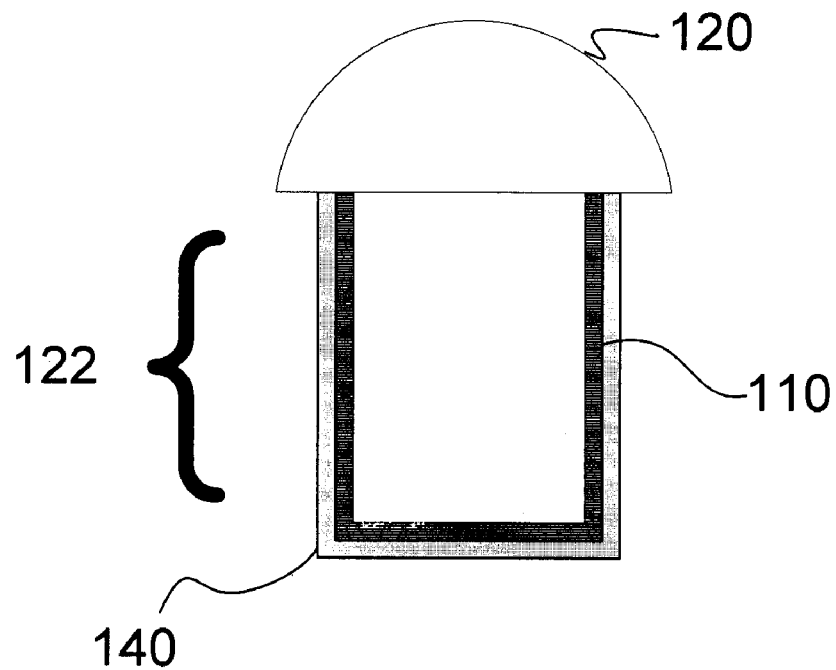
FIG. 2 illustrates a cross-sectional view of a fastener and an orifice treated in accordance with an aspect of the present invention.
Figure 2:
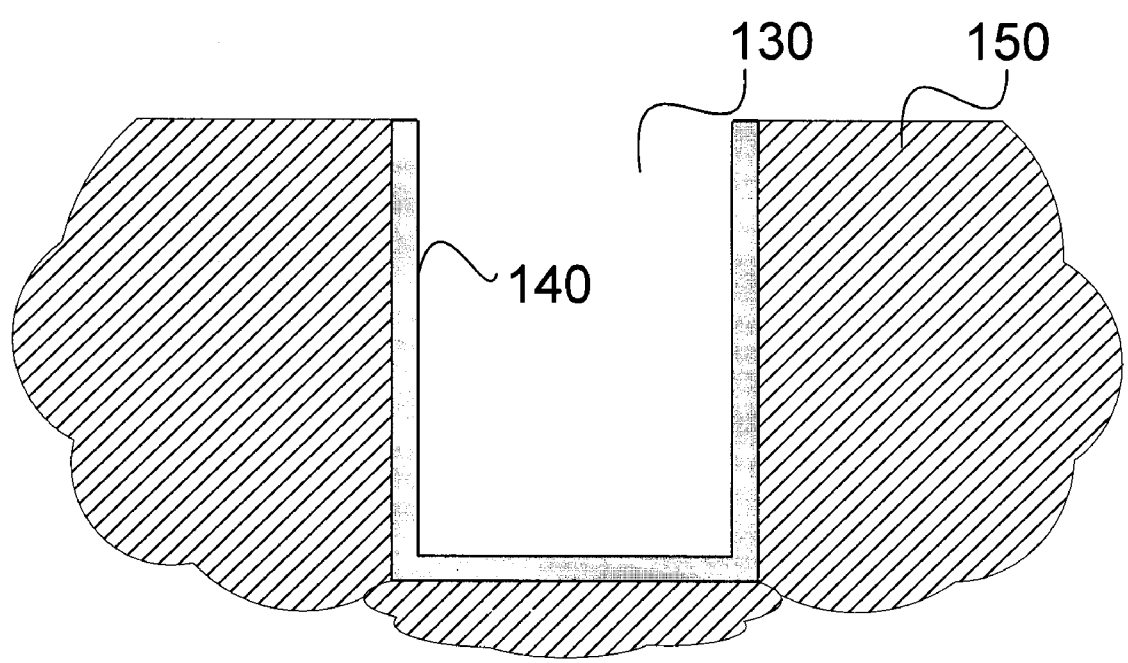

FIG. 2 shows a cross-sectional view of a system 200 for reducing galvanic corrosion associated with fastener 120 and orifice 130 of dissimilar compositions. In the non-limiting case of FIG. 2, fastener 120 takes the form of a bolt or screw, although any suitable form of fastening may be used. Further, in the non-limiting case of FIG. 2, orifice 130 is in material 150. Corrosive inhibitor coating 110 may be applied to at least a portion 122 of fastener 120 adapted to contact material 150. Anaerobic composition 140 may be interposed between the corrosive inhibited portion 122 of the fastener 120 and material 150, and expand after portion 122 is inserted into orifice 130.

Anaerobic composition 140 interposed between the corrosive inhibited portion 122 of the fastener 120 and the material 150 may take the form of a retaining compound such as Locite RC-680, for example, as is known in the art. Anaerobic composition 140 can have varying shear strengths depending on the solvents used or heat applied to the cured composition 140.

FIG. 3 shows a galvanic series illustrating some examples of anodic and cathodic metals. According to an aspect of the present invention, galvanic corrosion may be mitigated even where even where highly anodic and highly cathodic metals, such as magnesium and stainless steel, are used. Thus, the application of the corrosive inhibitor coating 110 and the anaerobic composition 140 may prevent galvanic corrosion associated with a fastener and an orifice of dissimilar compositions.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A method for preventing galvanic corrosion associated with a fastener of a first metal type and an orifice in a second metal type and for receiving said fastener, said method comprising:
   coating at least a portion of the fastener adapted to contact said second metal type with at least one corrosive inhibitor; and
   coating at least one of said corrosive inhibited portion of said fastener and at least a portion of the orifice with an anaerobic composition that expands after said corrosive inhibited portion of said fastener is at least partially inserted into said orifice.

2. The method of claim 1, wherein said anaerobic composition consists essentially of aromatic dimethacrylate ester.

3. The method of claim 1, wherein said anaerobic composition consists essentially of hydroxyalkyl methacrylate.

4. The method of claim 1, wherein said anaerobic composition consists essentially of bisphenol A fumarate resin.

5. The method of claim 1, wherein said corrosive inhibitor consists essentially of molybdelnum disulfide.

6. The method of claim 1, wherein said first metal type is one of an anodic compound and cathodic compound.

7. The method of claim 6, wherein said second metal type is another of said anodic compound and cathodic compound.

8. The method of claim 1, wherein said first metal comprises a cathodic compound.

9. The method of claim 8, wherein said second metal comprises an anodic compound.

10. The method of claim 1, wherein said first metal comprises steel.

11. The method of claim 10, wherein said second metal is an anodic compound.

12. The method of claim 10, wherein said second metal comprises aluminum.

13. The method of claim 1, wherein said first metal and second metal are suitable for forming a galvanic couple.

14. A system for reducing galvanic corrosion associated with fastener of a first metal type and an orifice in a second metal type and for receiving said fastener, said system comprising:
   a corrosive inhibitor coating at least a portion of the fastener adapted to contact said second metal type; and
   an anaerobic composition interposed between said corrosive inhibited portion of said fastener and orifice, and adapted to expand after said corrosive inhibited portion of said fastener is inserted into said orifice.

15. The system of claim 14, wherein said anaerobic composition consists essentially of aromatic dimethacrylate ester.

16. The system of claim 14, wherein said anaerobic composition consists essentially of hydroxyalkyl methacrylate.

17. The system of claim 14, wherein said anaerobic composition consists essentially of bisphenol A fumarate resin.

18. The system of claim 14, wherein said corrosive inhibitor consists essentially of molybdelnum disulfide.

19. The system of claim 14, wherein said first metal type is anodic and said second metal type is cathodic.

20. The method of claim 14, wherein said locking device comprises steel.

21. The system of claim 14, wherein said orifice is formed in a material comprising aluminum.

22. The system of claim 14, wherein said first and second metal type are suitable for forming a galvanic couple.

* * * * *